United States Patent
Kang et al.

(10) Patent No.: US 11,379,216 B2
(45) Date of Patent: Jul. 5, 2022

(54) SOFTWARE UPDATE AGENT DEVICE AND SOFTWARE PATCHING METHOD THROUGH THE SAME

(71) Applicant: LUNA Co., Ltd., Daegu (KR)

(72) Inventors: Dong Soo Kang, Daegu (KR); Dong Hwan Lee, Daegu (KR); Tae Ho Lee, Daegu (KR); Seung Wook Baek, Daegu (KR)

(73) Assignee: KONAMOBILITY COMPANY LIMITED

( * ) Notice: Subject to any disclaimer, the term of this patent is extended or adjusted under 35 U.S.C. 154(b) by 0 days.

(21) Appl. No.: 17/051,434

(22) PCT Filed: Mar. 13, 2020

(86) PCT No.: PCT/KR2020/003494
§ 371 (c)(1),
(2) Date: Oct. 28, 2020

(87) PCT Pub. No.: WO2021/040167
PCT Pub. Date: Mar. 4, 2021

(65) Prior Publication Data
US 2021/0349710 A1 Nov. 11, 2021

(30) Foreign Application Priority Data
Aug. 27, 2019 (KR) ........................ 10-2019-0105331

(51) Int. Cl.
*G06F 8/658* (2018.01)
*G06F 8/654* (2018.01)

(52) U.S. Cl.
CPC .............. *G06F 8/658* (2018.02); *G06F 8/654* (2018.02)

(58) Field of Classification Search
CPC ................................ G06F 8/658; G06F 8/654
See application file for complete search history.

(56) References Cited

U.S. PATENT DOCUMENTS

| | | | |
|---|---|---|---|
| 2004/0267833 A1* | 12/2004 | Meller | .................... G06F 8/658 |
| 2007/0050675 A1* | 3/2007 | Yu | ........................ G06F 11/1417 714/36 |

(Continued)

FOREIGN PATENT DOCUMENTS

| | | |
|---|---|---|
| JP | 2012190075 A | 10/2012 |
| KR | 100390867 B1 | 7/2003 |

(Continued)

OTHER PUBLICATIONS

International Search Report for PCT/KR2020/003494 dated Jun. 19, 2020.
Written Opinion for PCT/KR2020/003494 dated Jun. 19, 2020.

*Primary Examiner* — Wei Y Zhen
*Assistant Examiner* — Amir Soltanzadeh
(74) *Attorney, Agent, or Firm* — Renaissance IP Law Group LLP (57) ABSTRACT

The present invention relates to a software update agent device and a patching method through the same, and provides a software update agent for patching software program and its related data on a client device such as an autonomous vehicle, a smartphone, and the like, thereby patching the software program used in the client device and its related data easily and quickly, based on the differential data between old and new versions of software data provided from remote software update management server.

8 Claims, 6 Drawing Sheets

(56) References Cited

U.S. PATENT DOCUMENTS

| | | | | |
|---|---|---|---|---|
| 2015/0277897 | A1* | 10/2015 | Deng | .................... H04W 8/245 717/169 |
| 2017/0206079 | A1* | 7/2017 | Zhang | ................. G06F 11/1469 |
| 2019/0155598 | A1* | 5/2019 | Bainville | .................. G06F 8/71 |

FOREIGN PATENT DOCUMENTS

| | | |
|---|---|---|
| KR | 100876295 B1 | 12/2008 |
| KR | 20090070549 A | 7/2009 |
| KR | 20130055936 A | 5/2013 |
| KR | 20150005164 A | 1/2015 |
| KR | 101822485 B1 | 1/2018 |

\* cited by examiner

SOFTWARE UPDATE AGENT DEVICE AND SOFTWARE PATCHING METHOD THROUGH THE SAME

TECHNICAL FIELD

The present disclosure relates to a software update agent device and a patching method through the same, and in more detail, installing a software update agent for patching software program and its related data on a client device such as an autonomous vehicle, a smartphone, and the like, thereby patching the software program used in the client device and its related data easily and quickly, based on the differential data between old and new versions of software data provided from remote software update management server.

BACKGROUND ART

In recent years, as an IT (Information Technology) industry has greatly advanced, the IT continues to an automotive industry, which is a traditional manufacturing industry that focuses on creating direct tangible value, without ceasing to weigh indirect value creation that encompasses tangible and intangible technologies necessary for information means such as computers, software, Internet, multimedia, management innovation, administrative renovation, and the like.

In particular, the interest of IT is ever-increasing as autonomous vehicles that autonomously drives while deciding their locations and surrounding conditions are being developed.

The autonomous vehicles matter not only in hardware devices for processing a large amount of data in order to determine their own locations and surrounding circumstances, but also in continuous software management capabilities. In other words, it is essential to perform continuous software updates, in order to continuously fix bugs and defects in hardware devices and quickly respond to laws and regulations being changed.

However, in case of conventional autonomous vehicles as described above, since it is necessary to visit a service center or a dealer shop in order to update the software data, there are problems in time and economic inefficiencies.

On the other hand, as the functions of wireless communication terminals like smart phones become complicated, the software to be loaded have also many bugs, and the user's demands for adding functions are ever increasing.

Therefore, there are needs to frequently perform software patching and function updating in a wireless communication terminal.

On the other hand, when performing software update in a wireless communication terminal, the wireless communication terminal conventionally downloads the software via network and performs updating the software. However, because of the large amount of data, it takes a lot of time to download, a large amount of traffic is generated, and the cost using the data is increased. And there is a problem in that the wireless communication terminal cannot efficiently use radio resources like the situation that other tasks cannot be performed while downloading and patching the software.

Therefore, in an embodiment according to the present invention, a software update agent performing a patch of software program and its related data is installed on a client device such as an autonomous vehicle, a smart phone, and the like, the update management server performs the update of the software program and its related data based on the differential data generated by comparing old and new versions of the software data. Therefore, it is possible to reduce processing time and cost due to large amount of data transmission, increase user convenience, and improve system stability.

Hereinafter, the prior arts existing in the technical field of the present invention is briefly described, and then the technical matters to be differentiated from the prior arts are described.

Korean Patent Registration No. 0876295 (2008 Dec. 31) relates to a method for generating an inverse delta file and a firmware recovery method using the same. In the process of patching the original file block based on the delta file provided from an external device, an inverse delta block is generated based on each delta block, or an inverse delta file is generated by applying a difference algorithm to the original file block and the corresponding patched file block, and then stored in the location where the delta block is recorded. When the firmware update is not successfully performed by the user's update cancellation command or update environment, the patched original file is restored to the original file by using the generated reverse delta file.

The above prior art describes a method for generating a reverse delta file and a firmware recovery method using the same, which enables the firmware to be easily restored to its original state when the firmware update fails or is canceled.

Korean Patent Publication No. 2013-0055936 (2013 May 29) relates to a firmware update method and a device therefor. It includes an extracting unit for comparing a first file and a second file in block units, extracting a block of the second file referring to the block for each block of the first file, and counting the number of blocks of the extracted second file; and a determining unit for determining an update order for each block of the first file according to the number of blocks of the counted second file.

In this prior art, for each block of old file, since the number of blocks of a new file referring to each block is updated from a small sized block, even if the update fails in the middle of updating the block due to the removal of the battery or the like, the update may continue from the subsequent block of the previous update completed block.

As a result of reviewing the prior arts mentioned above, the prior arts describe a configuration for easily restoring the firmware to its original state when the firmware update fails or is canceled, and a configuration that can continue to from the subsequent blocks of the previous update completed block even if the update fails in the middle of the update.

On contrary, in accordance with an embodiment of the present invention, an update agent that performs patching of software programs and their related data is installed on a client device such as an autonomous vehicle or a smart phone. And by patching the programs and their related data based on the differential data generated by comparing old and new versions of software data provided from the update management server, it can reduce processing time and cost due to large amount of data transmission, and increase convenience of a user and system stability. The prior arts fail to describe or suggest these technical features of the present invention.

DISCLOSURE

Technical Problem

The present invention was created to solve the above problems. An objective of the present invention is to provide a method and apparatus for efficiently patching software data including programs, kernels, and file systems used in client devices such as autonomous vehicles or smart phones by using differential data between old and new versions of software data.

Another objective of the present invention is to provide a method and apparatus for easily and quickly patching software program and its related data of a client device based on a differential data, which is received from and generated in a remote update software by comparing new and old software data, wherein the client device embeds an update agent for patching the software program and its related data or the update agent is independently provided in a certain device.

Another objective of the present invention is to provide a method and apparatus for continuously restarting to patch the program and its related data from a location where a previous patch is completed, even though it is interrupted to be processed in the middle of patching the program and its related data to the client device through the update agent.

Another objective of the present invention is to provide a method and apparatus for reducing processing time and produced cost due to a large amount of data transmission, increasing user convenience, and improving system stability, through updating the software data of the client device using a differential data between old and new versions of software data.

Technical Solution

A software update agent device according to an embodiment of the present invention comprises: a parser configured to parse and extract difference related information for old and new versions of a specific software data; an information identifier configured to identify a partition and at least one or more blocks in the partition from the extracted difference related information; and a patch processor configured to generate new version of the software data from old version of the software data existing in a client device by using difference related information of old and new versions of the software data for the at least one or more blocks in the identified partition.

Wherein, the partition comprises at least more than one of blocks, and is a data distinguished from a program, a kernel, or a filesystem, and each of the block is, in case of the program and kernel, a data obtained by dividing entire data of the partition by a predetermined block size, each of the block is in case of the filesystem, the data obtained by dividing each file data composed of the file system by the block size.

In addition, the software update agent device further comprises: a difference compression identifier generating new version of the software data by reflecting the extracted difference related information to old version of the software data, extracting compressed data stream from the difference related information and extracting differential data stream from the compressed data stream. Wherein, the extracting the differential data stream from the compressed data stream configured to comprise a process of decompressing the compressed data stream through the opposite process of compressing the data stream. Wherein, the decompressing is to decompress the compressed data stream which is a lossless compressed data stream. Wherein, the compressed data stream further comprises compression information comprising conditions for performing the compression.

In addition, wherein the differential data stream is generated by aligning one of Equal, Insert or Mod as a sequence, wherein one of Equal, Insert or Mod is determined by comparing predetermined length of the differential data streams for each of corresponding blocks for old and new versions of the software data.

In addition, the software update agent device further comprises: a resume patch identifier determining whether a patch is a resume patch from the extracted difference related information, and as a result of the determination, if the patch is decided to be the resume patch, proceeding the patch from the next partition or block where previous patch process is completed; and a difference validity identifier proceeding the patch from the beginning of the patch by checking validity of the difference, if the patch is not a resume patch as a result of the determination In addition, the patch processor further configured to comprise: generating a first new version of a block based on the aligned entire old version of blocks and first difference block of the extracted difference related information, and overwriting the generated first new version of the block into old version of the block; generating (n−1)th new version of the block based on old version of the block obtained by subtracting first new version of the block from the aligned entire old version of the blocks and (n−1)th difference block of the extracted difference related information, and overwriting the generated (n−1)th new version of the block into corresponding old version of the block; and generating (n)th new version of the block based on old version of the block obtained by subtracting first new version of the block to (n−1)th new version of the block from the aligned entire old version of the blocks and (n)th difference block of the extracted difference related information, and overwriting the generated (n)th new version of the block into corresponding old version of the block. Wherein, the overwriting of the generated new version of the block into corresponding old version of the block is repeatedly performed until all the blocks in corresponding partition are entirely processed.

Moreover, a method for patching software data through a software update agent device according to an embodiment of the present invention comprises: parsing and extracting difference related information for old and new versions of a specific software data; identifying a partition and blocks in the partition from the extracted difference related information; patching old version of a software data in a client device with new version of a software data by using the difference related information of old and new versions of the software data for the blocks in the identified partition.

In addition, wherein, the partition comprises at least more than one of blocks, and is distinguished according to a program, a kernel, or a filesystem, Wherein, the block is data obtained by dividing all data of the partition by a predetermined block size in case of the program and kernel, and the block is data obtained by dividing each file data composed of the filesystem by the block size, in case of the filesystem, In addition, the patching is configured to: generate new version of the software data by reflecting the extracted difference related information to old version of the software data; and comprise extracting compressed data stream from the difference related information and extracting differential data stream from the compressed data stream. Wherein, the extracting the differential data stream from the compressed data stream configured to comprise a process of decompressing the compressed data stream through the opposite process of compressing the data stream. Wherein, the decompressing is to decompress the compressed data stream which is a lossless compressed data stream. Wherein, the compressed data stream further comprises compression information comprising conditions for performing the compression.

In addition, the differential data stream is generated by aligning one of Equal, Insert or Mod as a sequence, wherein one of Equal, Insert or Mod is determined by comparing predetermined length of the differential data streams for each of corresponding blocks for old and new versions of the software data.

In addition, the method of patching a software data further comprises; determining whether the patch is a resume patch or not from the extracted difference related information in the software update agent device; proceeding the patch from next partition or block where previous patch process is completed, if the patch is the resume patch as a result of the determination; and identifying a validity of the difference related information, if the patch is not the resume patch as result of the determination, and proceeding the patch from the beginning of the partition or block, if the difference related information is valid.

In addition, the patching further comprises: aligning entire old version of blocks from old version of the software data in the software update agent device; generating a first new version of a block based on the aligned entire old version of blocks and first difference block of the extracted difference related information, and overwriting the generated first new version of the block into old version of the block; generating (n−1)th new version of the block based on old version of the block obtained by subtracting first new version of the block from the aligned entire old version of the blocks and (n−1)th difference block of the extracted difference related information, and overwriting the generated (n−1)th new version of the block into corresponding old version of the block; and generating (n)th new version of the block based on old version of the block obtained by subtracting first new version of the block to (n−1)th new version of the block from the aligned entire old version of the blocks and (n)th difference block of the extracted difference related information, and overwriting the generated (n)th new version of the block into corresponding old version of the block. Wherein, the overwriting of the generated new version of the block into corresponding old version of the block is repeatedly performed until all the blocks in corresponding partition are entirely processed.

Advantageous Effects

As described above, according to a software update agent device and a patching method through the same, the software update agent embedded in a client device or provided in an independent device such as an autonomous vehicle or a smart phone easily and quickly patch software data including programs, kernels, and file systems based on differences generated by comparing old and new versions of software data provided from the update management server. Therefore, it is not necessary to receive the entire new version of software data, thereby reducing the time and cost of updating the software.

In addition, the present invention has an effect of increasing temporal, economic efficiency and convenience because a user of a client device does not need to directly visit a service center or a designated place for software update.

In addition, the present invention has an effect of performing a stable patching operation by restarting and patching in the next time from the position where the patch is completed, even if the patch is interrupted in the process of patching the software program and related data to the client device through the software update agent.

In addition, the present invention has an effect of improving the system stability of the client device by performing active and continuous software management on changes, bugs, and defects in laws or systems.

DETAILED DESCRIPTION

Hereinafter, preferred embodiments of a software update agent device and a method of patch through the same of the present invention are described in detail with reference to accompanying drawings. The same reference numerals denoted in each drawing indicate the same members. In addition, specific structural or functional descriptions for the embodiments of the present invention are exemplified for the purpose of describing the embodiments according to the present invention, and unless defined otherwise, all terms used herein, including technical or scientific terms have the same meaning as generally understood by a ordinary skilled person in the field of the art to which the present invention belongs. Terms as those defined in a commonly used dictionary should be interpreted as having meanings consistent with meanings in the context of related technologies, and it is preferable for the terms not to be interpreted as ideal or excessively formal meanings unless explicitly defined herein the present specification.

First, a target updated by using difference generated in the present invention is a software data including a program, a kernel, and a file system. The software data is binary data in principle, but it is a matter of course to support any data format including ASCII. That is, each of program, kernel and file system is preferably composed of binary data.

Meanwhile, in the present invention, it is possible to update binary data of each file in each folder while maintaining a structure of a folder in a specific file system, and update binary data of the entire specific file system.

However, in the present invention, it is a principle to update binary data of individual files while maintaining a structure of a folder in a specific file system. In this case, difference does not occur for a file unchanged in a new version of file system, and difference is generated only for a file changed in the new version of file system. Therefore, it is possible to reduce cost due to data generation, improve update speed of the file system, and moreover increase system stability related to the update.

On the other hand, when binary data is updated for a specific entire file system, if there exists information added to new version of a file system, it is inefficient because it creates a difference even for files that have not been changed after the point that the added information exists. Therefore, in this case, it is preferable to process the binary data separately with the changed part and the unchanged part.

The program refers to as an application program, a system program and the like, and indicates data deciding operations of the program or recorded according to a certain format.

The kernel is the most important core of a computer operating system. The kernel comprises an interrupt handler that processes all requests competitively requesting the service of the kernel, like terminating input/output operations, a scheduler determining which programs and what order share kernel processing time, and a supervisor that actually gives each process an approval to use the computer at the end of a schedule. The kernel has a memory manager that manages address space of operating system in a memory or a storage and evenly distributes the memory or storage to other users using all peripherals and kernel's services.

The file system keeps a set of preparing rules organized for reading, writing, and finding data from/on a hard disk drive in advance in order to record data on a computer, and refers to as a system indicating how to name computer files and where to place computer files logically for storage or retrieval of the computer files. All operating systems such as DOS, Windows, OS/2, Macintosh, Unix and so on comprise their own file systems, for example, FAT16, FAT32, NTFS are prepared for Windows, and ext2, reiserFS, ext3 are prepared for Linux. Files are also saved in a directory and newly generated files are named, the length of a file name is limited, which characters can be used are indicated, and the length of file name extension is limited. A file system can comprise a format for setting a path to a file through a directory structure. Sometimes a file system refers to as a part of OS or additional programs that support to organize files. NFS (Network File System) or AFS (Andrew File System) are representative.

Figure 1:
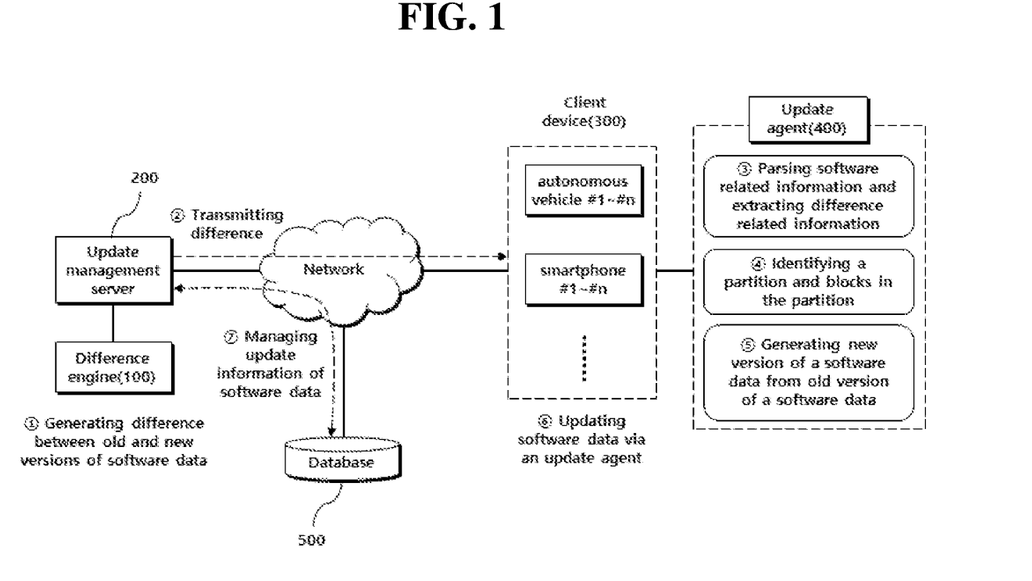
FIG. 1 is a schematic view for explaining an overall configuration of a software update agent device according to an embodiment of the present invention.

FIG. 1 is a drawing for describing the entire configuration of the software update agent device in accordance with an embodiment of the present invention.

As shown in FIG. 1, a device according to the present invention comprises a difference engine 100, an update management server 200, a client device 300, an update agent 400, a database 500 and the like.

When the software data concluding a program, a kernel or a filesystem is altered through modification, insertion, deletion, etc., the difference engine 100 selectively provides only the differential parts (i.e., the parts where modifications, insertions, deletions, etc. are performed) without the need to provide the entire software data to the client In addition, the difference engine 100 provides the differential parts to the client device 300 through the update management server 200. The update agent 400, which is provided by itself on the client device 300 or provided independently on a certain device, performs the software update simply and quickly.

That is, the difference engine 100 generates different parts between the old and new versions of the software data, not all of the new version of the software data, provides the different parts to the client device 300 so that the update is made, and thereby not only reducing the cost incurred due to transmitting the new version of the software data, but speeding up the update of the software data and improving the reliability of the systems related to updating the software data.

For example, in case of an autonomous vehicle, the software data had to be updated through a visit to a service center or a dealer shop. However, through the method of the present invention, the new version of the software data can be automatically updated via a network, thereby it is possible to obtain temporal and economic advantages.

In addition, even in case of a wireless communication terminal such as a smart phone, a lot of time and a large amount of traffic have been taken for the download since all the new version of the software data is downloaded and updated in the past. Through the method of the present invention, the software data can be updated with downloading only differential information (or differential part of the software data) of which the capacity is small amount, thereby reducing the cost of handling the data and efficiently utilizing radio resources through quick update.

Meanwhile, the difference engine 100 can be implemented as an independent device or in communication with the update management server 200 as shown in FIG. 1. In addition, the difference engine 100 can be integrally constructed with and used in the update management server 200.

The update management server 200 is a computer operated by a business operator generating the new version and managing the update of software data utilized in the client device 300. The update management server 200 requests the difference engine 100 to generate the differential data between the old and new versions of software data after the new version of software data is generated.

In addition, when the differential data generated by comparing the old and new versions of software data is inputted from the difference engine 100, the update management server 200 transmits the difference generated by the difference engine 100 to the corresponding client device 300 through a network. And then the update operation of the software data is finished when the update completion information is received from the client device 300.

The client device 300 is a device that is driven based on a software data, like a smartphone or an autonomous vehicle. A smartphone is a wireless communication terminal with various application programs installed. An autonomous vehicle is a device that grasps the surroundings and visits by itself to a destination by using a map, a satellite navigation system (GPS), and various sensors.

That is, when the differential data between the old and new versions of the software data is generated in the difference engine 100 and received from the update management server 200 through the network, the client device 300 provides the differential data between old and new versions of the software data to the update agent 400 so as to update the old version of the software data with the new version of the software data based on the differential data. And when the update of the software data is completed, the client device 300 generates update completion information, and the generated update completion information is transmitted to the update management server 200 through the network.

The update agent 400 is embedded in the client device 300 or implemented in an independent device. And the update agent 400 patches (or corrects) the old version of the software data installed in the client device 300 to the new version of the software data by referring to the differential data provided from the update management server 200.

In addition, in the process of patching with the new version of the software data based on the differential data, when the patching is forcibly terminated (for example, in the case of happening an event that a user stops to process a program for the patching or a battery is exhausted or runs out), the update agent 400 additionally provides a resume function that resumes the patching again from the point (i.e., position or corresponding step of the patching) where the patching was previously completed, not restarts the patching from the beginning point.

That is, if the patching is forcibly stopped while the patching is in progress, the update agent 400 identifies (or checks) the previously normally completed position by referring to block checksum information when the next patching is executed again, and restarts the patching from the position where the patching is previously completed. Accordingly, a fast and stable patch operation can be performed.

The database 500 stores and manages various kinds and plurality of software used in the client device 300.

In addition, the database 500 stores and manages device types, software versions, update history, etc. for each of a plurality of client devices 300. and stores and manages the differential data between the old and new versions of the software data generated by the difference engine 100.

Hereinafter, the process of efficiently updating an old version of the software data with a new version of the software data in the client device 300 such as an autonomous vehicle and a smartphone is described in more detail as follows.

The difference engine 100 generates a differential data between old and new versions of the software data at a request of the update management server 200 (①), and outputs the generated differential data to the update management server 200. At this time, the differential data can be compressed to reduce the size of data.

The method of generating the differential data will be described in detail by referring to FIG. 3.

Then, the update management server 200 transmits the differential data between the old and new versions of the software data provided from the difference engine 100 to the client device 300 to be updated through the network (②). The client device outputs the differential data received from the update management server 200 to the update agent 400, and thereby updating an old version of the software data with a new version of the software data.

Hereinafter, the update of the software using the differential data is described in detail. The update agent 400 parses software related information and extracts the difference related information included in the differential data for specific old and new versions of the software data received from the update management server 200 at the request of the client device 300, and extracts the requested difference related information for the old and new versions of the software data (③).

That is, it is to parse a difference related information in the software related information for an old version of the software data previously installed on the client device 300 managed with XML written by a developer and another difference related information for the old and new versions of the software data transmitted from the update management server 200. At this time, the difference related information is the information on a partition for a differential part (i.e., a part in which at least one or more than one of a modification, an insertion, a deletion, etc. is taken) between old and new versions of the software data and the information related to a block included in the partition.

In addition, a partition is divided into a different partition of data according to a program, a kernel, or a filesystem, and comprises at least one or more blocks. In addition, the block is data that all data in a program (binary) or a kernel are divided by corresponding block sizes in the case of the partition for the program (binary) or the kernel. In case of the filesystem, the block is data that each file constituting the filesystem are divided by corresponding block sizes.

In addition, the update agent 400 identifies or checks a partition and a block included in the partition from the difference related information extracted by the parsing (④).

In addition, after checking or identifying a partition and blocks included in the partition, the update agent 400 performs a patch which generates a new version of a software data from an old version of a software data existing in the client device 300 for the identified partition and blocks by using the difference related information of the old and new versions of the software data (⑤).

At this time, the patch generates a new version of the software data by reflecting the differential data stream to an old version of the software data, wherein the differential data stream is restored through a process opposite to a compressing process of generating a compressed data stream for a differential data, and the compressed data stream is received from the update management server 200. The differential data stream is restored from lossless compressed data stream, which comprises compressed data and further comprises corresponding compression related information including conditions related to performing the compression.

In addition, the differential data stream is a sequence listing one of Equal, Insert or Mod by determining whether a new version of the software data is Equal, Inserted or Modified to an old version of the software data by comparing a predetermined length of old and new versions of the software data.

Accordingly, the client device 300 completes updating new version of software data according to the patch process of the update agent 400 (⑥). And the client device 300 generates update completion information of a new version of the software data, transmits the update completion information for the generated software data to the update management server 200, and finishes the update operations.

In addition, the update management server 200 stores and manages the update information of software data for each client device 300 in the database 500, based on the update completion information of software data provided from the client device 300 (⑦).

Figure 2:
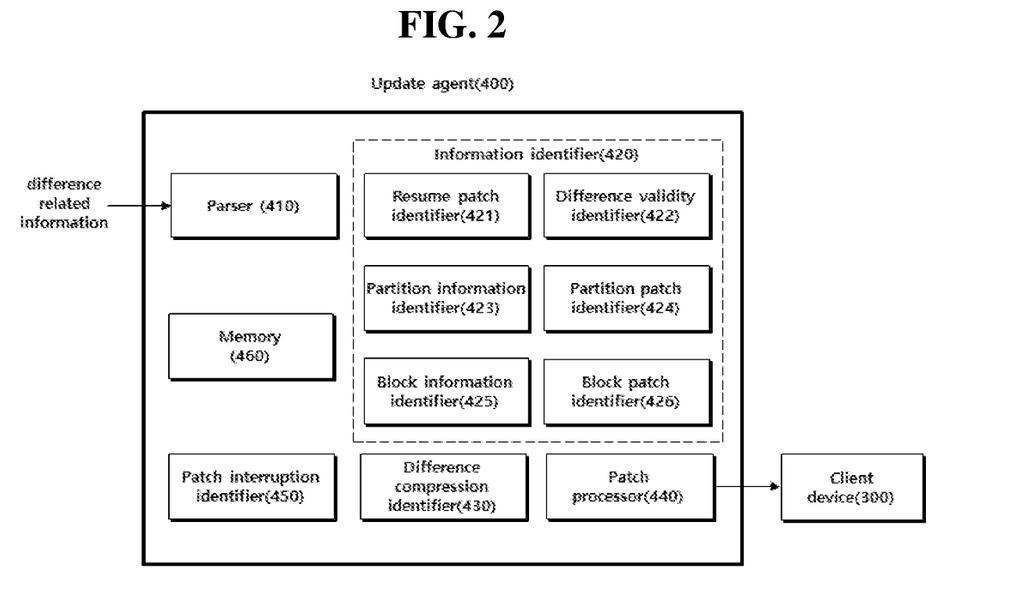
FIG. 2 is a schematic view for showing a more detailed configuration of the software update agent device according to an embodiment of the present invention.

FIG. 2 is a drawing showing in more detail the configuration of the update agent according to one embodiment of the present invention.

As shown in FIG. 2, the update agent 400 comprises a parser 410, an information identifier 420, a difference compression identifier 430, a patch processor 440, and a patch interruption identifier 450, a memory 460 and the like.

In addition, although not shown in the drawing, the update agent 400 may further comprise a power supply for supplying operating power to each component, an input processor for processing input data for various functions, a main controller for overall control for each component of the update agent 400, and the like.

The parser 410 parses and extracts difference related information on a specific old and new version of software data provided from the update management server 200. And the parser 410 stores the extracted difference related information of the old and new version of software data in the memory 460. The parsing is that a series of character streams representing software data information is translated into machine language to become a meaningful unit of information.

That is, the parser 410 parses the difference related information on both the old version of software data installed on the client device 300 managed by XML written by a developer and the new version software data transmitted from the update management server 200. And through the parsing process, the information on a partition and blocks comprised of the partition for a differential part (that is, a portion in which modification, insertion, deletion, etc. are performed) between old and new versions of software data is identified.

The information identifier 420 includes a resume patch identifier 421, a difference validity identifier 422, a partition information identifier 423, a partition patch identifier 424, a block information identifier 425, and a block patch identifier 426. And the information on the partition and blocks comprised of the partition for the differential part is identified from the difference related information for the old and new versions of software data extracted by parsing of the parser 410.

The resume patch identifier 421 determines whether a patch is a resume patch or not by referring to signature information from the difference related information identified by the information identifier 420, and if the patch is determined to be a resume patch, the patch process proceeds with next partition and block where the previous patch is completed.

Wherein the signature information is a part in which header checksum value (i.e., CRC 32) of a differential data and the signature value (i.e., resume or not) are recorded. If the header checksum value of a differential data and the signature value are the same, the patch is confirmed as a normal patch that proceeds with the patch from the beginning of the software data. If the header checksum value of a differential data and signature value are not the same, the patch is identified as a resume patch that proceeds next to the previously completed patch.

If the patch is not a resume patch as a result of determination of the resume patch identifier 421, the difference validity identifier 422 determines the validity through checking whether the differential data is valid or not by comparing version of a differential data and version of the differential data in the update agent 400, checksum of a corresponding differential data received from the difference engine 100 and checksum in the differential data, checksum of old version of software data received from the difference engine 100 and checksum in the previously installed old version of software data. Then as a result of the verification, if the differential data is valid, the differential data is read, and the patch is processed from the beginning.

The partition information identifier 423 identifies at least one or more partition information from the difference related information for old and new versions of software data extracted by parsing of the parser 410.

That is, the partition information identifier 423 identifies at least one or more partition information comprising old version of software data, differential data, block size, and number of blocks from the parsed difference related information.

The partition patch identifier 424 identifies whether the patch proceeds or not for a specific partition identified by the partition information identifier 423. That is, in case of a resume patch, by identifying whether a specific partition is already patched or not, and if the patch of the current partition is already done, the patch of next partition is performed without performing the previous patch again.

In addition, the partition patch identifier 424 additionally performs a function of verifying whether the data is correct target data to be patched or not, by performing a validity check comparing a checksum of an old version of the software data and a checksum of the differential data (i. e., CRC 32).

The block information identifier 425 identifies whether a specific partition has not been previously patched and the block data is correct target to be patched as a result of verification of the partition patch identifier 424. As a result of the above verification, if a specific partition has not been previously patched and the block data is correct target to be patched, the block information identifier 425 identifies at least one or more block information including an old version data block, a differential data block, a block size, and the like, by referring to an old version of the software data and the difference related information of the old and new versions of the software data parsed and extracted by the parser 410.

The block patch identifier 426 identifies whether to proceed with patching for each block of a specific partition verified by the block information identifier 425. As a result of the above identification, if the patch is a resume patch, the block patch identifier 426 identifies whether a specific block of a specific partition is a block in which a patch has already been processed. If the specific block has been previously patched, the patch of the next block is proceeded without patching the previous patched block again.

The difference compression identifier 430 determines whether the differential data is compressed before proceeding with patching each partition and blocks comprised of each partition identified by the information identifier 420. If the differential data is compressed as a result of the determination, the compressed differential data is decompressed.

That is, the compressed differential data stream is extracted and the differential data is restored from the compressed differential data stream.

At this time, the process of extracting the differential data stream from the compressed differential data stream includes a process of compressing the differential data stream and restoring the differential data through an opposite process. The restoration is performed from lossless compressed differential data, and the compressed differential data stream may include compression information including conditions for performing the compression.

The patch processor 440 generates a new version of software data from an old version of the software data existing in the client device 300 by using the difference related information of the old and new versions of the software data for the block included in the partition identified by the information identifier 420, and proceeds with the patch. Hereinafter, a specific method of patching will be described in more detail referring to FIG. 4 to FIG. 6.

That is, the patch processor 440 generates a new version of software data by reflecting the differential data to old version of software data installed on the client device 300.

When the patch processing is stopped due to an event such as a patch program interruption or a battery power shortage in the process of executing the patch in the patch processor 440, the patch interruption identifier 450 identifies a location (or position, place etc.) where the patch is stopped. Then, when a resume patch is performed in the patch processor 440, the patch is processed again from the corresponding block with reference to the identified stopping position. That is, when the patch is executed again in the next time, the patch restarts to proceeded from the location where the patch is completed.

The memory 460 stores various application programs operated in the update agent 400.

In addition, the memory 460 temporarily stores the difference related information between old and new versions of software data parsed and extracted by the parser 410, the information on partitions and blocks included in each of the partitions for different parts between old and new versions of software data identified by the information identifier 420, and the like.

Figure 3:
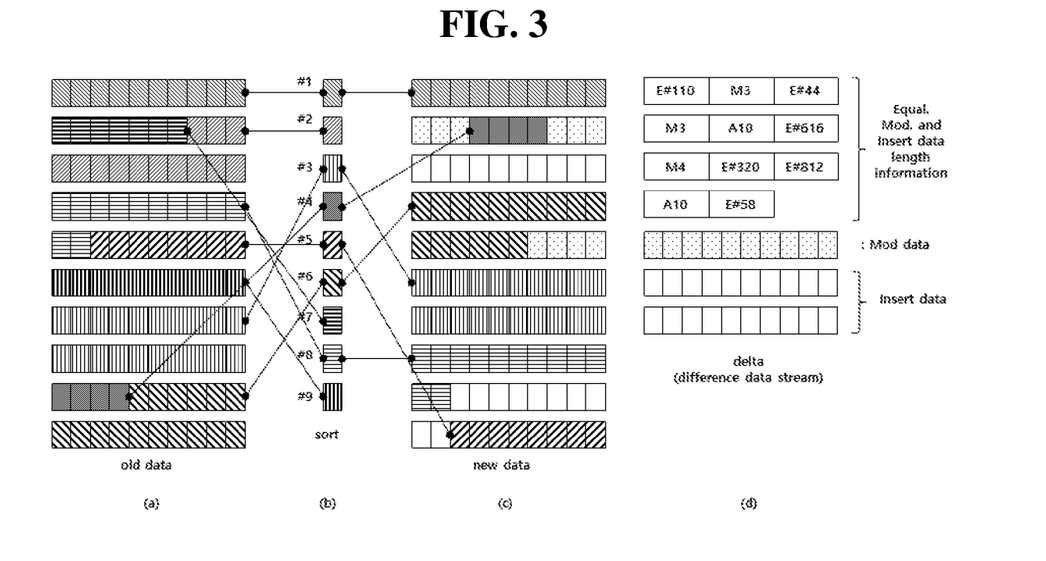
FIG. 3 is a drawing for explaining a method of generating a differential data between old and new versions of a software data in a difference engine applied to the present invention.

FIG. 3 is a drawing for explaining the method of generating a differential data between old and new versions of software data in the difference engine applied to the present invention.

The differential engine 100 sorts blocks #1 to #9 as shown in FIG. 3 (b) in order to conveniently search for blocks constituting the partition of an old version of software data shown in FIG. 3 (a). Wherein, while the above described blocks are classified and sorted into 9 types in accordance with and embodiment of the present invention, and the number of classified blocks can be reduced or increased according to the configuration of the blocks.

Hereinafter, the difference engine 100 searches by comparing a block (i.e., a new version of a block) constituting a partition of new version of software data shown in FIG. 3 (c) and a sorted old version block shown in FIG. 3 (b). Based on the result of the comparison and search, the difference engine 100, as shown in FIG. 3 (d), generates a differential data stream (delta) expressed with Equal for the same data between old and new versions of blocks, Mod for partially modified data in the new version of block, and Insert for newly added data in the new version of the block.

Wherein, the differential data stream shown in FIG. 3 (d) indicates length information for each block of the new version of the blocks. The differential data stream is composed of length information of the data that is stored by classifying the data into Equal, Mod and Insert, and the actual data such as a Mod data and an Insert data.

Wherein, the Equal is described with only the length information of the data, the Mod is described with both the length information of the data and the actual data, the Insert is described with the length information of the data, the actual data and the position information of the next Equal. And in case of the Insert, the difference engine 100 identifies the Insert through an indicator (For example, set to 0xFEFF).

As shown in FIG. 3 (d), the length information of the data may be represented by E #110 (meaning that there are 10-Equal (the same data) of block #1, M3 (meaning that there are 3-Mod (modified)), E #44, M3, A10 (meaning that there are 10 newly inserted data), E #616, M4, E #320, E #812, A10, E #58, and the like.

Figure 4:
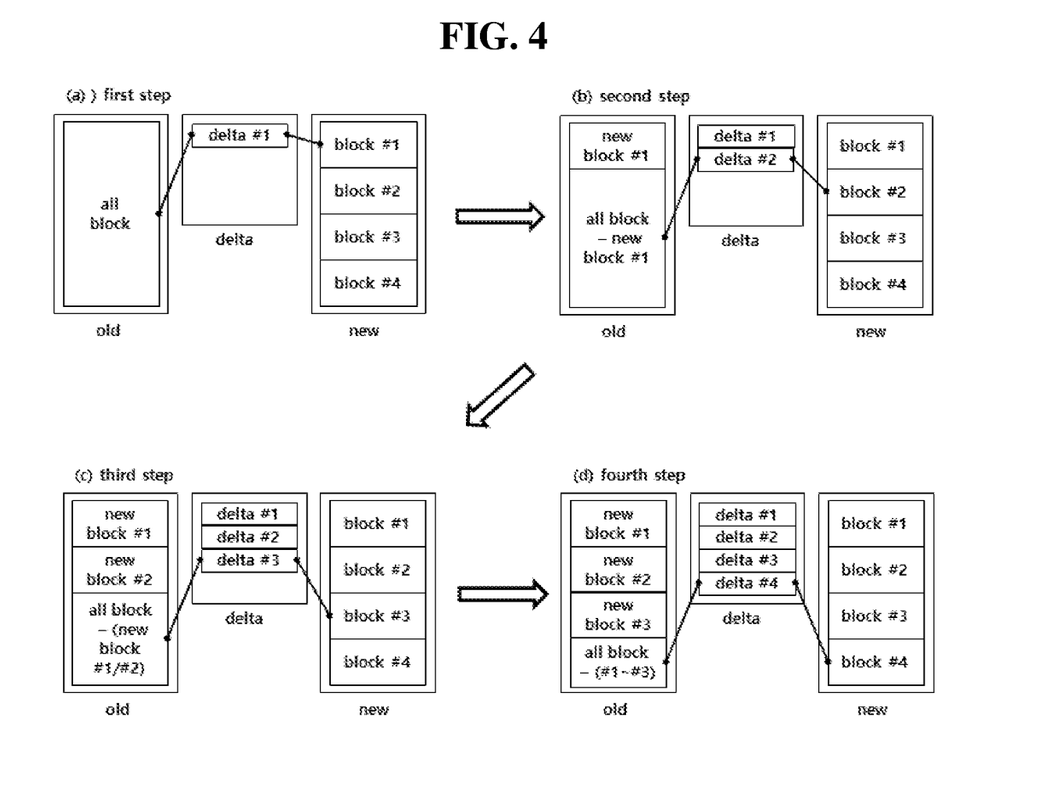
FIG. 4 is a drawing for explaining a concept of patch for updating a software data in a software update agent applied to the present invention.

FIG. 4 is a drawing for explaining the concept of a patch for updating software data in the update agent applied to the present invention.

As shown in FIG. 4, the update agent 400 generates a new version of a block based on a block of a differential data stream (delta) generated by comparing corresponding old and new versions of software data. The patch is performed in that the generated new version of the block is overwritten to old version of the block in the partition for the old version of the software data previously installed on the client device 300. The description is given as follows in case of an example that there are 4 blocks and 4 differential data in a specific partition for an old version of software data First, the update agent 400 sorts all the old version of blocks in an old version of the software data. And as shown in FIG. 4 (a), a first new version of a block (block #1) is generated based on the sorted all the old version of blocks and a first differential data of a block (delta #1) of the extracted difference related information. And the step 1 of overwriting the generated first new version of the block to the old version of the block is performed.

Also, as shown in FIG. 4 (b), the update agent 400 generates a second new version of a block (block #2) based on the old version of a block (all block−new block #1) obtained by subtracting the first new version of the block (block #1) from the sorted all the old version of blocks and a second difference data of a block (delta #2) of the extracted difference related information. And the step 2 of overwriting the generated new second version of a block to the old version of a block is performed.

In addition, as shown in FIG. 4 (c), the update agent 400 generates a third new version of a block (block #3) based on the old version of a block (all block−(new block #1+new block #2)) obtained by subtracting the first new version of a block (block #1) and the second new version of a block (block #2) from the sorted all the old version of blocks and a third differential data block (delta #3) of the extracted difference related information. And the step 3 of overwriting the generated the third new version of a block to the old version of a block is performed.

In addition, as shown in FIG. 4 (d), the update agent 400 generates a fourth new version of a block (block #4) based on the old version of a block (all block−(new block #1+new block #2+new block #3)) obtained by subtracting the first new version of block (block #1), the second new version of a block (block #2) and the third new version of a block (block #3) from the sorted all the old versions of blocks and a fourth differential data block (delta #4) of the extracted difference related information. And by performing the step 4 of overwriting the generated fourth new version of a block to the old version of a block, the patch process of the corresponding partition is completed.

Figure 5:
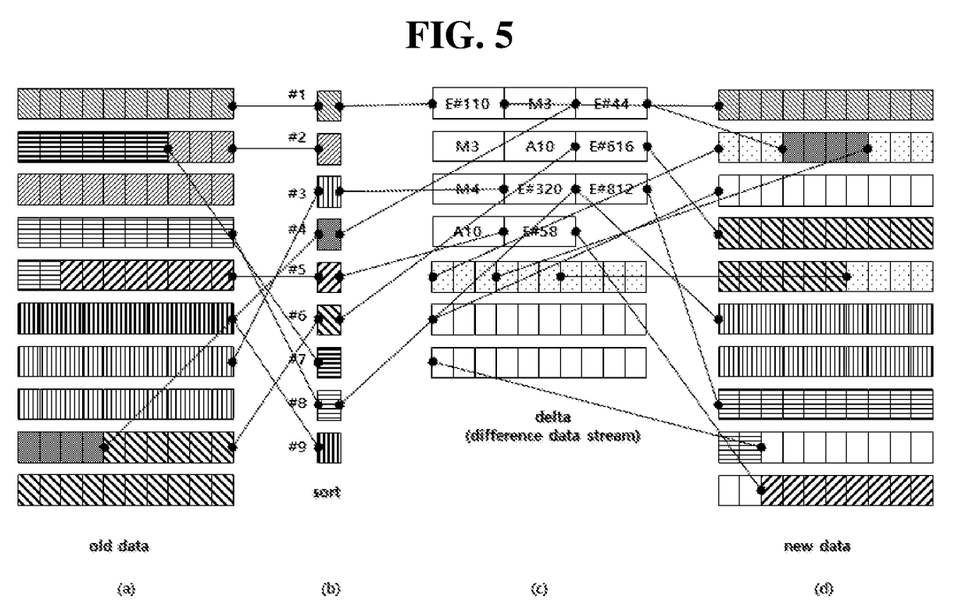
FIG. 5 is a drawing for explaining a method of a patch in a software update agent applied to the present invention.

FIG. 5 is a drawing for describing a patch method in the update agent applied to the present invention.

The update engine 400 sorts blocks #1 to #9 as shown in FIG. 5 (b), in order to conveniently search for blocks constituting a partition of old version of software data shown in FIG. 5 (a). Wherein, the above described blocks are classified and sorted into 9 blocks in accordance with one embodiment of the present invention, and number of classifications may be reduced or increased according to the configuration of blocks in a partition.

Then, the update agent 400 performs a patch by generating a new version of a block and overwriting the generated new version of a block to the old version of a block as shown in FIG. 5 (d), by referring to the differential data stream (delta) shown in FIG. 5 (c).

The differential data stream shown FIG. 5 in (c) indicates length information for each block of the new version of blocks. The differential data stream is composed of length information of data that is classified into Equal, Mod, and Insert, and actual data for Mod data and Insert data.

For example, the update agent 400 writes the data in the old version of a block to the data in the new version of a block by the length of the Equal data based on the length information of the differential data stream E #110 as shown in FIG. 5 (c). And the update agent 400 writes the Mod data in the differential data stream to the data in the new version of a block by the length of the Mod data based on the length information of the data M3. And the update agent 400 repeats E #44, M3 Equal and Mod until Insert indicator (i.e., 0xFEFF) appears.

And when the Insert indicator (or can be called as a delimiter) (i.e., 0xFEFF) of A10 appears, the update agent 400 writes the Insert data in the differential data stream to the data of a new version of a block by the length of the Insert data. In this way, the update agent 400 repeats the patch for E #616, M4, E #320, E #812, A10 and E #58 Equal, Mod and Insert.

Figure 6:
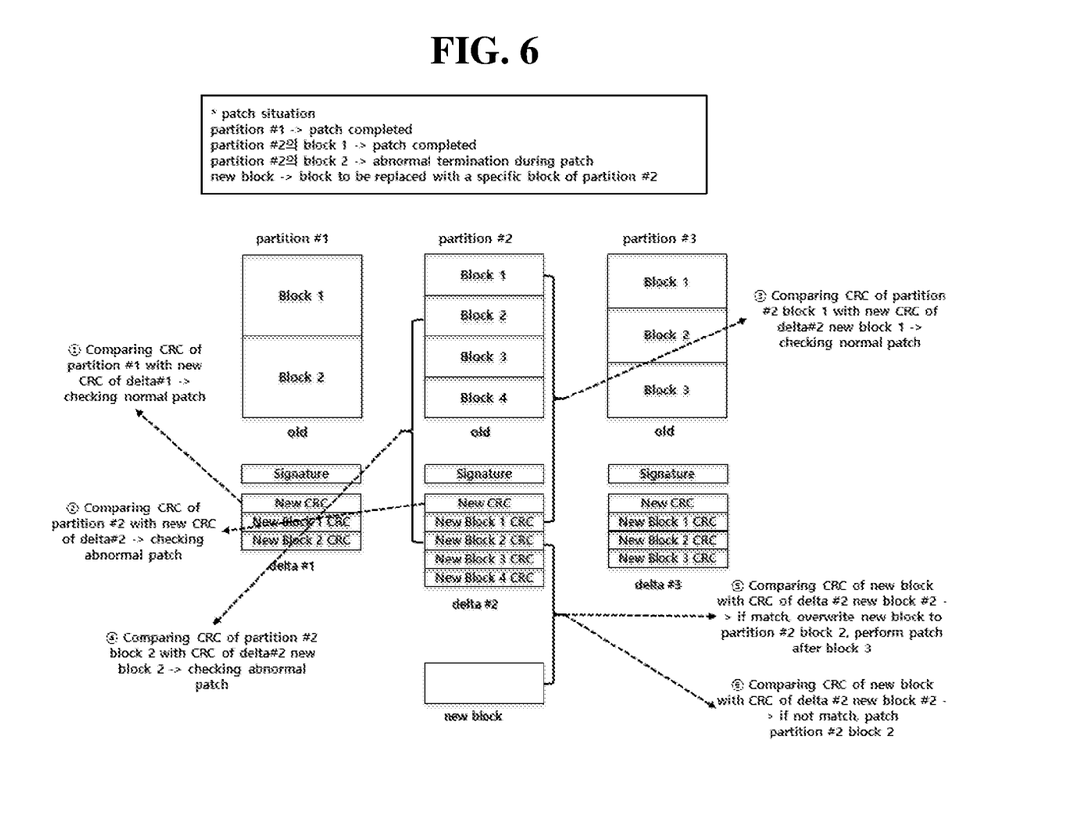
FIG. 6 is a drawing for explaining an embodiment of a resume patch applied to the present invention.

FIG. 6 is a drawing for explaining an embodiment of a resume patch applied to the present invention.

The update agent 400 can patch an old version of software data used in the client device 300 with the new version of software data by using the differential data between old and new versions of software data received from the update management server 200. Wherein, if the patch has been previously performed, the update agent 400 does not proceed with the patch from the beginning. That is, the update agent 400 performs a resume patch that resumes the patch from the partition or block interrupted in the middle of the previous patch.

For example, as shown in FIG. 6, in the current patch situation, it is assumed that the patch of partition #1 of old version of software data is completed, and the patch for block 1 is completed and the patch for block 2 is not completed in the process of patching partition #2 of old version of software data. In addition, it is assumed that new version of a block in the differential data stream delta #2 is a block to be replaced with a specific block in old version of partition #2.

If the patch operation resumes in such a situation, the update agent 400 compares CRC of old version of a partition #1 with new CRC of the differential data stream (delta #1), and verifies whether the patch was normally performed (i.e., same or not same). And if the patch was normally performed as a result of the verification, the patch of partition #1 is not performed (①).

In addition, the update agent 400 compares the CRC of the old version of partition #2 with the new CRC of the differential data stream (delta #2), and verifies whether the patch was normally performed. And if the patch was performed abnormally as a result of the verification, the update agent 400 prepares the patch for partition #2 (②).

If the patch did not normally proceed, the update agent 400 compares CRC of block 1 in old version of partition #2 with CRC of new block 1 in the differential data stream (delta #2), and verifies whether the patch was normally performed. And if the patch was normally performed, the patch of block 1 in partition #2 is not performed (③).

Thereafter, the update agent 400 compares CRC of block 2 of old version of partition #2 with CRC of new block 2 of the differential data stream (delta #2), and verifies whether the patch was normally performed. And if the patch was abnormally performed as a result of the verification, the update agent 400 prepares the patch for block 2 in partition #2 (④).

Wherein, if CRC of a new block and CRC of a new block 2 of the differential data stream (delta #2) match, the update agent 400 overwrites the new block to block 2 of partition #2, and performs the patch of block 3 thereafter (⑤).

However, if CRC of a new block and CRC of a new block 2 of the differential data stream (delta #2) do not match, the update agent 400 proceeds to patch block 2 of partition #2, and performs the patch of block 3 thereafter (⑥).

Hereinafter, a method for patching a software through the software update agent device according to an embodiment of the present invention will be described in detail with reference to FIG. 7 and FIG. 8. Wherein, each step according to the method of the present invention can be changed in order by the environment or those skilled in the art.

Figure 7:
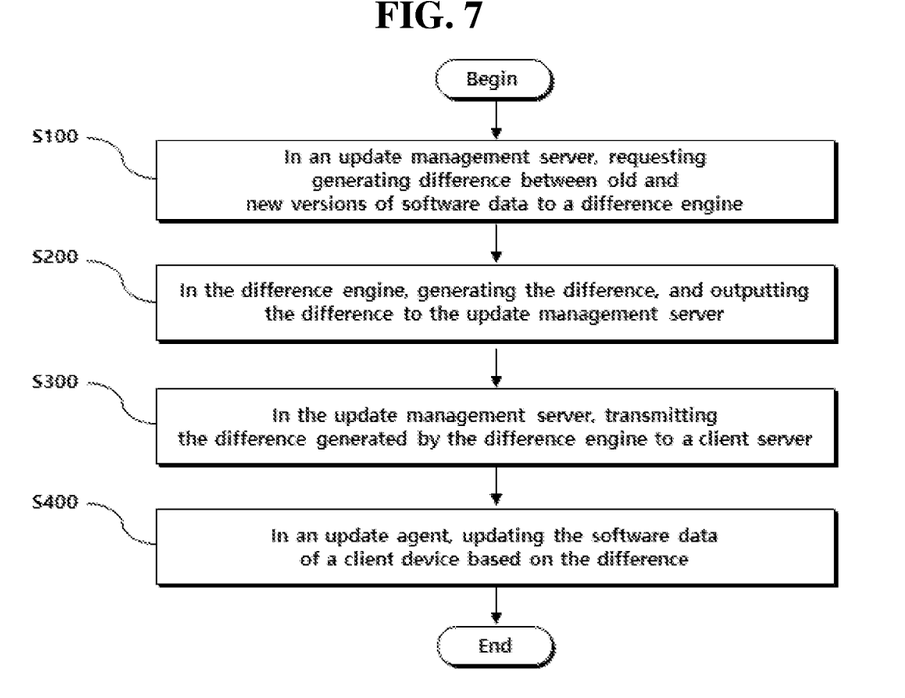
FIG. 7 is a flowchart illustrating detailed software data update processes according to an embodiment of the present invention.

FIG. 7 is a flowchart illustrating in detail a software data update process according to one embodiment of the present invention.

As shown in FIG. 7, when software data including new versions of a program, a kernel, and a filesystem are generated, the update management server 200 requests the difference engine 100 to generate a differential data between old and new versions of the software data in order to update new version of software data to the client device 300 (S100).

Accordingly, the difference engine 100 generates a differential data between old and new versions of software data based on the request of the update management server 200, and provides the generated differential data to the update management server 200 (S200).

Wherein, as described in FIG. 3, the differential data comprises length information of data showing the length information for each block of new version of blocks, and actual data including partially modified data (Mod) and newly added data (Insert). And the length information of data is stored as classified with Equal for the same data between old and new versions of a block, Mod for partially modified data, and Insert for newly added data.

The update management server 200 receiving a differential data between old and new versions of software data from the difference engine 100 through the step S200 transmits the differential data generated by the difference engine 100 to the client device 300 through the network (S300).

The client device 300 updates an old version of software data with a new version of software data based on a differential data received from the update management server 200 through the update agent 400 comprised inside the client device 300 or in an independent device. Then the client device 300 generates update completion information and transmits it to the update management server 200 (S400). A detailed description of updating the software data using the differential data in the update agent 400 will be described in detail by referring to FIG. 8.

The update management server 200 finishes the operations related to updating software data in the corresponding client device 300 based on the update completion information received from the client device 300.

Figure 8:
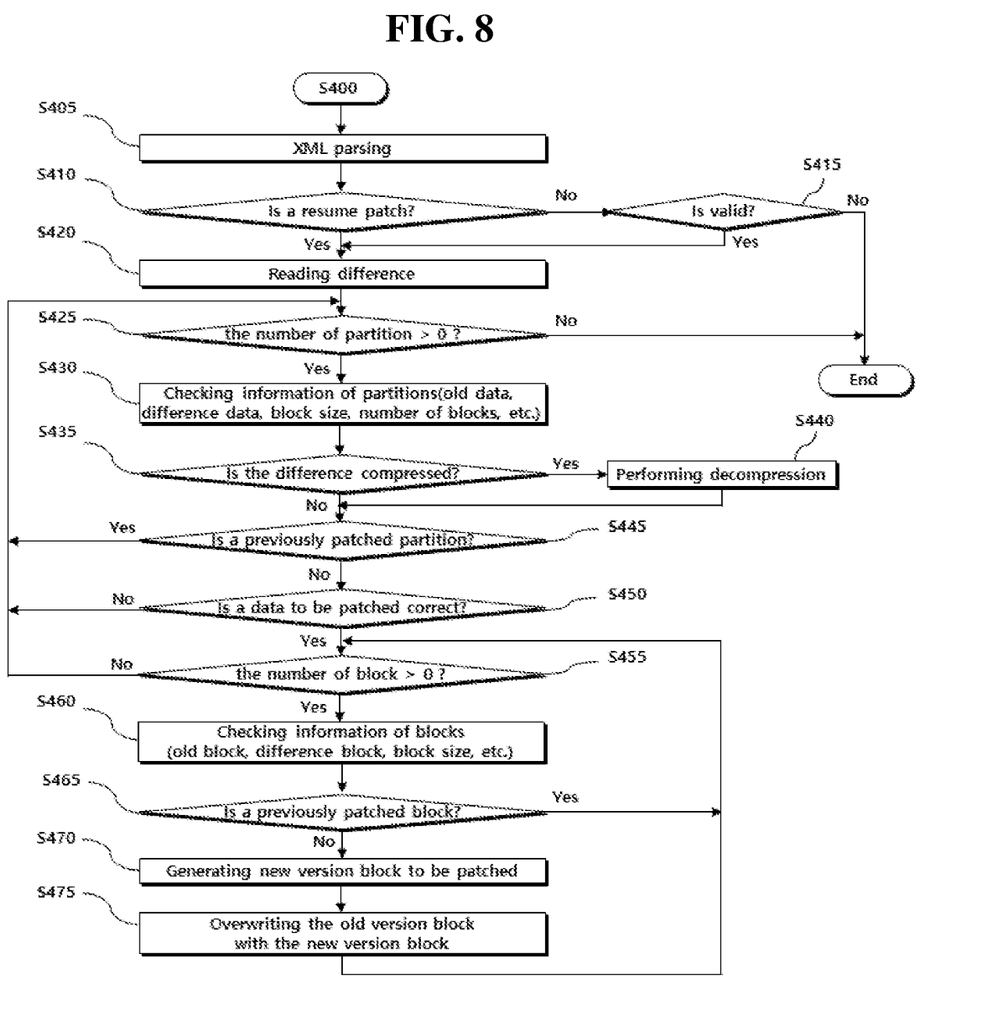
FIG. 8 is a flowchart illustrating detailed operational processes of a method of a patch for a software through a software update agent device according to an embodiment of the present invention.

FIG. 8 is a flowchart illustrating in more detail an operational process of a patch method of a software data through an software update agent device according to an embodiment of the present invention.

As shown in FIG. 8, the update agent 400 parses an old version of a software data installed in the client device 300 and the difference related information between old and new versions of software data received from the update management server 200, according to the request of the client device 300 (S405). That is, by parsing the difference related information managed by XML written by a developer, the update agent 400 identifies information on a partition and blocks in the partition for different parts (i.e., parts in which modification, insertion, deletion, etc. were made) between old and new versions of software data.

After parsing XML through step S405, the update agent 400 determines whether a resume patch is performed, by referring to the extracted signature information in the difference related information (S410). In this case, the delta header checksum (i.e., CRC 32) value (A) and signature value (B) are stored in the signature information. If A and B are the same, it is identified as a normal patch. If A and B are not the same, it is identified as a resume patch.

If it is determined not to be a resume patch by step S410, the update agent 400 identifies a validity by checking the version of the parsed difference related information (S415).

For example, by checking CRC 32 of the differential data (file) and CRC 32 of the previously installed software data, if it matches, the patch proceeds, and if not, the patch is terminated.

If a resume patch is determined in step S410, or if a valid differential data is determined in step S415, the update agent 400 reads the differential data (S420). That is, the patch is prepared thereafter the partition and block where the patch is completed, or the patch is prepared from the beginning.

After reading the differential data through step S420, the update agent 400 determines whether the number of partitions of the software data to be updated is more than 0 or not (S425). And if the number of partitions is more than 0 as a result of the determination, the update software 400 identifies at least one or more partition information including an old version of software data, a differential data, a block size, and number of blocks, by referring to information for old version of software data and the difference related information parsed through step S405 (S430).

After identifying the partition information through step S430, the update agent 400 determines whether the differential data is compressed or not before proceeding with patching of the current partition (S435). If the differential data is compressed, corresponding decompression is performed (S440), and if the differential data is not compressed, step S445 is performed. That is, if the differential data is compressed, the update agent 400 extracts and restores the compressed data stream from the differential data, and extracts a differential data stream from the compressed data stream.

After identifying whether the differential data is compressed or not through steps S435 and S440, the update agent 400 determines whether the corresponding partition is already patched or not (S445).

As a result of the determination in step S445, if the corresponding partition has already been patched, the update agent 400 repeatedly performs step S425 in which whether the number of partitions is more than 0 is determined in order to check the patch for the next partition.

In addition, as a result of the determination in step S445, if the corresponding partition has not been previously patched, the update agent 400 determines whether the data to be patched is correct or not by performing a validity check by comparing checksum of an old version of the software data and that of the differential data (S450). For example, the update agent 400 checks CRC 32 of the corresponding old version of a partition and CRC 32 of the corresponding previous version of a partition. As a result of the check, if it matches, the update agent 400 checks whether the partition should be patched or not. However, if it does not match, the update agent 400 repeats step S425 to check the patch for the next partition.

If the result of the determination in step S450 is the data to be patched, the update agent 400 determines whether the number of blocks included in the corresponding partition to be updated is 0 or more than 0 (S455). And if the number of blocks is not 0 as a result of determination, the update agent 400 checks at least one or more block information in an old version of blocks, a differential data of a block, and a block size from the information for old version of software data, and the difference related information parsed through step S405 (S460). And if the number of blocks is 0, the update agent 400 repeats step S425 to check the patch for the next partition.

After checking the block information through step S460, the update agent 400 determines whether the corresponding block is a block in which the patch has already been processed before proceeding with patching of the current block (S465).

As a result of the determination in step S465, if the corresponding block has already been patched, the update agent 400 repeatedly performs step S455 in which whether the number of blocks is 0 or more than 0 is determined in order to check the patch of the next block.

Also, as a result of the determination in step S465, if the corresponding block has not been previously patched, the update agent 400 generates a new version of a block to be patched from the block information checked in step S460 (S470). And the update agent 400 overwrites the generated new version of a block the old version of a block in order to patch a new version of software data of the client device 300 (S475).

Steps S470 and S475 of generating new version of a block based on the differential data and overwriting the generated new version of a block to old version of a block are the same as described in FIG. 4. That is, the update agent 400 sorts entire old version of blocks from old version of software data. And the update agent 400 generates first new version of a block based on the sorted entire old version of blocks and first differential data of a block of the extracted difference related information, and overwrites the generated first new version of a block to old version of a block. And the update agent 400 generates (n−1)th new version of a block based on old version of a block obtained by subtracting first new version of a block from the sorted entire old version of blocks and (n−1)th differential data of a block of the extracted difference related information, and overwrites the generated (n−1)th new version of a block to old version of a block. And the update agent 400 generates (n)th differential data for new version of a block based on old version of a block obtained by subtracting first new version of a block to (n−1)th new version of a block from the sorted entire old version of blocks and (n)th differential data of a block of the extracted difference related information, and overwrites the generated (n)th new version of a block to old version of a block. Wherein, overwriting the generated new version of a block to old version of a block is repeatedly performed until entire blocks included in the corresponding partition are processed.

Meanwhile, if the difference related information is not valid as a result of the determination in step S415, or if the number of partitions is 0 as a result of the determination in step S425, the update agent 400 finishes patching of an old version of the software data by using the differential data.

As described above, the present invention has been described with reference to the embodiment shown in the drawings, but this is only exemplary, and those skilled in the art to which the art pertains will understand that it is possible to have various modifications and other equivalent embodiments. Therefore, the technical protection scope of the present invention should be determined by the following claims.

INDUSTRIAL APPLICABILITY

As described above, according to the present invention, the update agent embedded in the client device or provided in an independent device patches the program and related data easily and quickly based on the differential data provided by the update management server. Therefore, it is not necessary to receive the entire new version of a software data, which reduces the time and cost of updating the software data.

Also, the present invention can increase temporal and economic efficiencies and convenience because the user using the client device does not need to directly visit a service center or a designated place for software update.

Also, the present invention can perform a stable patch operation by restarting and patching next from the position where the patch is completed, even if the patch is interrupted in the process of patching the software program and related data to the client device through the update agent.

Also, the present invention can improve the system stability of the client device by performing positive and continuous software management on changes, bugs, and defects in laws or systems.

The invention claimed is:

1. A method for patching software through a software update agent device, comprising:
   parsing software related information between old and new versions of a software data, and extracting difference related information for the old and new versions of the software data;
   identifying a partition and blocks in the partition from the extracted difference related information; and
   patching the old version of the software data in a client device with the new version of the software data by using the extracted difference related information of the old and new versions of the software data for the blocks in the identified partition,
   wherein the partition comprises one or more of the blocks and is distinguished according to a program, a kernel, or a filesystem,
   wherein each of the blocks is a data obtained by dividing all data of the partition by a predetermined block size, in case of the program or kernel, and each of the blocks is a data obtained by dividing each file data composed of the filesystem by the block size, in case of the filesystem,
   wherein the difference related information comprises a differential data stream generated for the one or more of the blocks with one of Equal, Insert or Mod as a sequence, determined by comparing each of corresponding blocks for the old and new versions of the software data, and
   wherein the patching comprises:
      generating the new version of the software data by reflecting the extracted difference related information to the old version of the software data, and
      extracting a compressed data stream from the difference related information and extracting the differential data stream from the compressed data stream,
   wherein extracting the differential data stream from the compressed data stream includes decompressing the compressed data stream through an opposite process of compressing the data stream,
   wherein the decompressing decompresses the compressed data stream, which is a lossless compressed data stream, and
   wherein the compressed data stream comprises compression information comprising conditions for creating the compressed data stream.

2. The method for patching a software through a software update agent device of claim 1, wherein the differential data stream is generated by aligning one of Equal, Insert or Mod as a sequence according to one of Equal, Insert or Mod and is determined by comparing corresponding blocks for the old and new versions of the software data in each of the blocks.

3. The method for patching a software through a software update agent device of claim 1, further comprising:
   determining whether the patch is a resume patch or not from the extracted difference related information in the software update agent device;
   proceeding the patch from next partition or block where a previous patch process is completed, if the patch is the resume patch as a result of the determination; and
   identifying a validity of the difference related information, if the patch is not the resume patch as the result of the determination, and proceeding the patch from the beginning of the partition or block, if the difference related information is valid.

4. The method for patching a software through a software update agent device of claim 1, wherein the patching includes:
   aligning the entire old version of blocks from old version of the software data in the software update agent device;
   generating a first new version of a block based on the aligned entire old version of blocks and first difference block of the extracted difference related information, and overwriting the generated first new version of the block into old version of the block;
   generating an (n−1)th new version of the block based on old version of the block obtained by subtracting first new version of the block from the aligned entire old version of the blocks and an (n−1)th difference block of the extracted difference related information, and overwriting the generated (n−1)th new version of the block into corresponding old version of the block; and
   generating an (n)th new version of the block based on old version of the block obtained by subtracting first new version of the block to the (n−1)th new version of the block from the aligned entire old version of the blocks and an (n)th difference block of the extracted difference related information, and overwriting the generated (n)th new version of the block into corresponding old version of the block,
   wherein the overwriting of the generated new version of the block into corresponding old version of the block is repeatedly performed until all the blocks in corresponding partition are entirely processed.

5. A software update agent device, comprising:
   a parser configured to parse software related information between old and new versions of a software data, and extract difference related information for the old and new versions of the software data;
   an information identifier configured to identify a partition and one or more blocks in the partition from the extracted difference related information; and
   a patch processor configured to generate a new version of the software data from the old version of the software data existing in a client device by using the extracted difference related information of the old and new versions of the software data for the one or more blocks in the identified partition,
   wherein, the partition comprises one or more of the blocks and is distinguished from a program, a kernel, or a filesystem, and each of the blocks is, in case of the program or kernel, a data obtained by dividing entire data of the partition by a predetermined block size, each of the blocks is, in case of the filesystem, the data obtained by dividing each file data composed of the filesystem by the block size, and
   wherein the difference related information comprises a differential data stream generated for the one or more of the blocks with one of Equal, Insert or Mod as a sequence, determined by comparing each of corresponding blocks for the old and new versions of the software data, and wherein the patch processor is further configured to:
  generate the new version of the software data by reflecting the extracted difference related information to old version of the software data, and
  extract a compressed data stream from the difference related information and extracting the differential data stream from the compressed data stream through a process of decompressing the compressed data stream through an opposite process of compressing the data stream,
  wherein the decompressing decompresses the compressed data stream, which is a lossless compressed data stream,
  wherein the compressed data stream comprises compression information comprising conditions for extracting the compressed data stream.

6. The software update agent device of claim 5,
wherein the differential data stream is generated by aligning one of Equal, Insert or Mod as a sequence, wherein one of Equal, Insert or Mod is determined by comparing predetermined length of the differential data streams for the old and new versions of the software data included in the block.

7. The software update agent device of claim 5, further comprising:
  a resume patch identifier configured to determine whether a patch is a resume patch from the extracted difference related information in the software update agent device; and
  a difference validity identifier configured to proceed the patch from the next partition or block where previous patch process is completed if, as a result of the determination, the patch is determined to be the resume patch, and is further configured to check a validity of the difference and proceed the patch from the beginning if, as a result of the determination, the patch is not a resume patch.

8. The software update agent device of claim 5, wherein the patch processor is further configured to:
  generate a first new version of a block based on the aligned entire old version of blocks and first difference block of the extracted difference related information, and overwrite the generated first new version of the block into old version of the block;
  generate an (n−1)th new version of the block based on old version of the block obtained by subtracting first new version of the block from the aligned entire old version of the blocks and an (n−1)th difference block of the extracted difference related information, and overwrite the generated (n−1)th new version of the block into corresponding old version of the block; and
  generate an (n)th new version of the block based on old version of the block obtained by subtracting first new version of the block to the (n−1)th new version of the block from the aligned entire old version of the blocks and an (n)th difference block of the extracted difference related information, and overwrite the generated (n)th new version of the block into corresponding old version of the block,
wherein the patch processor is configured to repeatedly overwrite the generated new version of the block into corresponding old version of the block until all the blocks in corresponding partition are entirely processed.

* * * * *